J. A. STEINMETZ.
VALVE.
APPLICATION FILED AUG. 27, 1918.
1,334,566.
Patented Mar. 23, 1920.
FIG. 1.
FIG. 2.
FIG. 4.
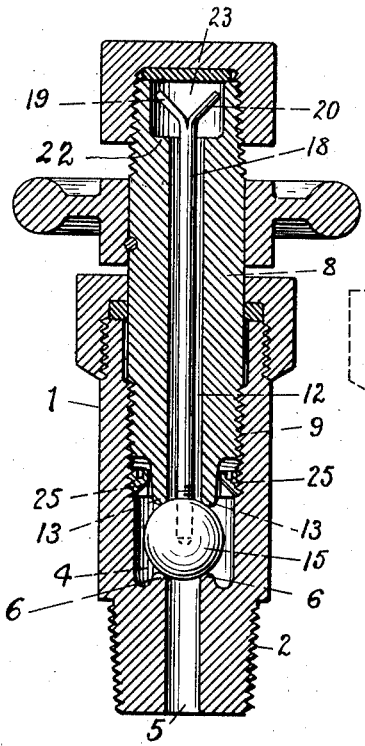
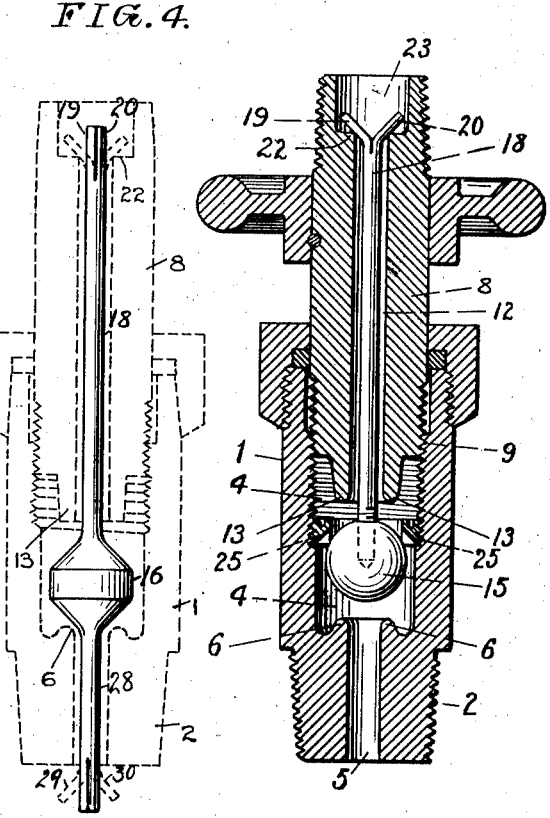
FIG. 3.
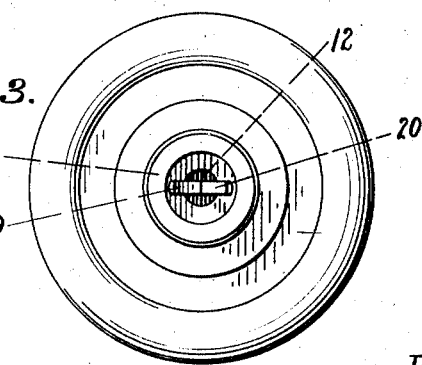
Inventor
Joseph A. Steinmetz
By F. DeWitt Goodwin
Attorney

UNITED STATES PATENT OFFICE.

JOSEPH A. STEINMETZ, OF PHILADELPHIA, PENNSYLVANIA.

VALVE.

1,334,566. Specification of Letters Patent. Patented Mar. 23, 1920.

Application filed August 27, 1918. Serial No. 251,643.

*To all whom it may concern:*

Be it known that I, JOSEPH A. STEINMETZ, a citizen of the United States, residing at Philadelphia, in the county of Philadelphia and State of Pennsylvania, have invented certain new and useful Improvements in Valves, of which the following is a specification.

My invention relates to improvements in valves and particularly relates to valves for use in connection with cylinders containing gas or liquid, under pressure, for controlling the outlet of the contents of the cylinder and for refilling the cylinder. My invention also relates to further improvements in a valve for which Letters Patent of the United States No. 1,275,783 were granted to me on the 13th day of August, 1918.

The object of the present invention is to provide means for controlling the valve sealing member when the valve is open, so that the valve will remain open when pressure is exerted, in either direction, against the sealing member. A further object of my invention is to provide means for controlling the sealing member by which the latter may be free to rotate and which will not interfere with the proper seating of the sealing member and the closing of the valve; and a still further object of my invention is to provide means for assembling the several parts of the valve.

In the accompanying drawing, Figure 1, is a vertical section of my improved valve, showing the valve closed; Fig. 2, is a view similar to Fig. 1, showing the valve open; Fig. 3, is a plan view of Fig. 2, and Fig. 4, is a side elevation of a modified form of the sealing member, detached.

Referring to the drawing in which like reference characters refer to like parts, 1 represents the body or housing of the valve provided at one end thereof with a screw threaded portion 2 by which the valve may be secured in a container, not shown in the drawing.

The housing 1 is provided with a central chamber 4 and a central aperture 5, of smaller diameter; the latter extending through the portion of the housing which enters the container. A shoulder is thus provided which forms a valve seat 6 in the housing 1. A valve stem 8 is mounted in the central chamber 4 and is provided with a screw thread 9 which engages a screw thread formed in the housing so that by rotating the valve stem 8 the inner end of the latter will be moved toward or away from the valve seat 6 for the purpose of opening and closing the valve. The valve stem 8 is provided with a longitudinal passageway 12 through the same and a valve seat 13 is formed upon the inner end of the valve stem 8.

A sealing member 15 is provided between the valve seat 6 of the housing and the valve seat 13 of the valve stem 8 for closing the passageway through the valve.

The sealing member 15 may be in the form of a ball, 15 as shown in Figs. 1 and 2, or it may be in the form of a double cone member, 16 as shown in Fig. 4. In the latter form the conical surfaces are adapted to close the valve seats 6 and 13 in the housing and in the valve stem.

The sealing member 15 is provided with means for preventing the same from seating upon the valve seat 6 when the valve is open and especially when the cylinder is being refilled through the valve. The valve stem 8 is provided with means for causing the sealing member 15 to move with it and thus lift the sealing member from the seat 6, when the valve is open. This result may be accomplished in various ways, but I prefer to have a rod, 18 either attached to or formed as an integral part of the sealing member, as shown in Figs. 1 and 4. The opposite end of the rod 18 is split longitudinally so that the end portions 19 and 20 may be bent outwardly and thus engaged by the shoulder 22 formed at the bottom of the enlarged orifice 23 in the outer end of the valve stem 8 for the free longitudinal movement of the engaging members 19 and 20 of the rod 18 when they are extended, as shown in Fig. 1. Thus the rod 18 will have sufficient longitudinal movement, in relation to the valve stem, to permit the latter to move toward the sealing member and close the valve seats 6 and 13, as shown in Fig. 1. When the valve stem 8 is moved in the opposite direction, to open the valve, the portions 19 and 20 of the rod 18 will be engaged by the shoulder 22 of the valve stem 8 and the sealing member 15 will be carried with the valve stem a sufficient distance to lift the sealing member from the valve seat 6, as shown in Fig. 2.

A stripper ring 25 is secured in a fixed position in the housing 1 and engages the sealing member 15 and holds the latter away from valve seat 13 on the inner end of the valve stem 8, when the valve is open, as shown in Fig. 2.

The parts of the valve are assembled by first inserting the sealing member 15 and then securing the stripper ring 25 in the housing. The rod 18 of the sealing member is passed through the valve stem before the portions 19 and 20 are spread apart. The valve stem is then screwed into the housing to the open position of the valve, as shown in Fig. 2. The sealing member 15 is held up against the stripper ring 25 by inserting a tool through aperture 5 in the housing and the ends 19 and 20 of the rod 18 are then opened to lock the rod in the valve stem, as shown in Fig. 2. By extending the rod 18 through the valve stem to a point adjacent to the outer end thereof the rod may be conveniently locked in the valve stem after the parts are assembled.

By providing a sealing member with rods 18 and 28 extending in either direction, as shown in Fig. 4, the stripper ring 25 may be dispensed with and the two rods will hold the sealing member away from the valve seats 6 and 13 when the valve is open. The rod 28 is bifurcated to form the end portions 29 and 30 for engaging the valve and limiting the inward movement of the rod.

Having thus described my invention I claim and desire to secure by Letters Patent:

1. A valve having a passageway formed therethrough, a valve seat in the valve located in the said passageway, a sealing member mounted within the passageway through the valve adapted to engage the said valve seat and control the passageway formed through the valve, and a member joined to the sealing member and extending through the said passageway for limiting the distance which the sealing member may move away from the valve seat when the valve is open.

2. A valve having a passageway formed therethrough, a valve seat in the said passageway formed through the valve, a sealing member mounted within the said passageway adapted to engage the said valve seat and control the passageway through the valve, a rod on the sealing member extended in said passageway, and a stop upon the rod to limit the distance the sealing member may move away from the valve seat when the valve is open.

3. A valve having a passageway formed therethrough, a valve seat in the said passageway formed through the valve, a sealing member mounted within the said passageway adapted to control the said passageway, a rod on the sealing member extended in said passageway, and said rod having its free end bifurcated to form a stop to limit the distance the sealing member may move away from the valve seat when the valve is open.

4. A valve comprising a housing having a passageway formed therethrough, a valve seat formed in the housing, a valve stem having a passageway formed therethrough, a valve seat formed in the valve stem, a sealing member between the said valve seats, rods upon the sealing member extending in different directions through the said passageway in the housing and one of said rods extending through the valve stem, and means upon the rods for limiting the movement of the rods to hold the sealing member away from the valve seats when the valve is open.

In testimony whereof I affix my signature.

JOSEPH A. STEINMETZ.